US012104351B2

(12) United States Patent
Deotarse et al.

(10) Patent No.: US 12,104,351 B2
(45) Date of Patent: Oct. 1, 2024

(54) WORK IMPLEMENT WITH HEADER LIFT CONTROL

(71) Applicant: DEERE & COMPANY, Moline, IL (US)

(72) Inventors: Sumit V. Deotarse, Pune (IN); Mohan A. Vadnere, Pune (IN); Subhanshu Gupta, Pune (IN); Mitchell R. Usasz, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 295 days.

(21) Appl. No.: 17/813,616

(22) Filed: Jul. 20, 2022

(65) Prior Publication Data

US 2024/0026639 A1    Jan. 25, 2024

(51) Int. Cl.
    *A01D 41/14*    (2006.01)
    *E02F 3/84*    (2006.01)
    *E02F 9/20*    (2006.01)

(52) U.S. Cl.
    CPC .......... *E02F 3/845* (2013.01); *A01D 41/145* (2013.01); *E02F 9/2041* (2013.01)

(58) Field of Classification Search
    CPC ......... E02F 9/265; E02F 9/2203; E02F 3/845; E02F 9/2041; A01D 41/145
    See application file for complete search history.

(56) References Cited

U.S. PATENT DOCUMENTS

| 11,168,711 B2* | 11/2021 | Morrison | ................ F15B 11/17 |
| 2006/0248868 A1* | 11/2006 | Otto | ...................... A01D 41/141 |
| | | | 56/10.2 E |
| 2021/0123461 A1* | 4/2021 | Morrison | ................ F15B 11/17 |

FOREIGN PATENT DOCUMENTS

DE     102021131266 A1 *  6/2023  .......... A01D 41/141

* cited by examiner

*Primary Examiner* — Abiy Teka

(57) ABSTRACT

A work implement includes a support controller disposed in communication with a hydraulic lift cylinder. The support controller initiates a control activation signal for commanding movement of the hydraulic lift cylinder to move the head support from an initial start position to a commanded support position. The support controller determines a stop signal position based on the current rate of movement of the head support toward the commanded support position. The stop signal position may further be based on a current fluid pressure of an associated float system. The support controller ceases or stops the control activation signal when the head support reaches the stop signal position, whereby the head support decelerates over a distance after cessation of the control activation signal such that the head support substantially stops movement at the commanded support position.

20 Claims, 5 Drawing Sheets

WORK IMPLEMENT WITH HEADER LIFT CONTROL

TECHNICAL FIELD

The disclosure generally relates to a work implement having, and more particularly to a system for raising and lowering a head attachment of the work implement.

BACKGROUND

A work implement may include a traction unit configured to receive and support a work head. In some work implements, such as a self-propelled windrower, the work head is attached to the forward end of the traction unit via a head support. The head support is moveably attached to a frame of the traction unit, and is selectively controllable to control a position and/or orientation of the work head. For example, the work implement may include a lift cylinder for raising and lowering the head support and thereby the work head, and a tilt cylinder for controlling an angular position or orientation of the work head relative to a ground surface. The lift cylinder and the tilt cylinder may be controlled via a support controller. The support controller may send electronic signals to respective control valves of the lift cylinder and/or the tilt cylinder to command and/or control movement thereof.

In addition to the lift cylinder and the tilt cylinder, the work implement may further include a float system interconnecting the frame of the traction unit and the work support. The float system may be selectively controlled via the support controller to provide a desired float pressure resisting movement of the head support along a vertical axis. During operation of the work implement, in response to the work head contacting the ground surface and/or an object on the ground surface, the work head and the head support attached thereto are moved upward along the vertical axis. The float system may be configured to resist downward movement of the head support and the work head, thereby slowing the rate at which the work head descends back into its set work position and/or orientation. By slowing the rate at which the work head descends, downward movement of the work head is eased, thereby preventing the work head from bouncing off the ground surface and smoothing operation of the work head. An amount of "float" provided by the float system, i.e., the amount of resistance against downward movement of the head support and associated work head, is adjustable by changing the fluid pressure within the float system.

The support controller may determine when to initiate and stop a control signal to the lift cylinder in order to achieve a desired or commanded head position. The speed at which the various sensors detect the data needed to determine when to stop the control signal to the lift cylinder, the speed at which the control valves of the hydraulic cylinders are actuated, the size and weight of the particular work head being used, the current fluid pressure in the float system, as well as the computational time required to make these determinations, all introduce an inherent latency into the control of the lift cylinder. If not tuned properly, the head support and associated work head may undershoot or overshoot the desired or commanded head position, thereby causing the head support and associated work head to oscillate back and forth until the commanded head position is finally achieved, in other words, continuously hunt back and forth for the commanded head position.

SUMMARY

A work implement is provided. The work implement includes a traction unit having a frame. A head support is moveably attached to the frame for upward and downward movement relative to a ground surface along a substantially vertical axis. A hydraulic lift cylinder interconnects the frame and the head support. The hydraulic lift cylinder is controllable to raise and lower the head support along the vertical axis. A support controller is disposed in communication with the hydraulic lift cylinder. The support controller includes a processor and a memory having a lift control algorithm stored thereon. The processor is operable to execute the lift control algorithm to initiate a control activation signal for commanding movement of the hydraulic lift cylinder to move the head support from an initial start position to a commanded support position. The support controller may further sense a position of the head support as the head support moves from the initial start position toward the commanded support position, and determine a current rate of movement of the head support from the initial start position toward the commanded support position. The support controller determines a stop signal position of the head support. The stop signal position is determined based on the current rate of movement of the head support toward the commanded support position. The stop signal position is disposed between the initial start position and the commanded support position. The support controller ceases or stops the control activation signal when the head support reaches the stop signal position, whereby the head support decelerates over a distance after cessation of the control activation signal such that the head support substantially stops movement at the commanded support position.

In one aspect of the disclosure, the work implement may further comprise a float system interconnecting the frame and the head support. The float system is controllable to provide a desired float pressure resisting movement of the head support along the vertical axis. The support controller is disposed in communication with the float system. The processor is operable to execute the lift control algorithm to determine the stop signal position based on a current float pressure of the float system. In one aspect of the disclosure, the processor may be operable to execute the lift control algorithm to determine the current float pressure of the float system.

In one aspect of the disclosure, the hydraulic lift cylinder includes an associated lift control valve disposed in fluid communication with the hydraulic lift cylinder. The lift control valve is responsive to the control activation signal for controlling extension or retraction of the hydraulic lift cylinder, which in turn moves the head support upward or downward along the vertical axis. In one implementation, the lift control valve is an on/off hydraulic control valve.

In one aspect of the disclosure, the float system includes a hydraulic float cylinder interconnecting the frame and the head support, and an accumulator in fluid communication with the hydraulic float cylinder. Upward movement of the head support along the vertical axis compresses a volume of the accumulator, for resisting or slowing movement of the head support in the downward direction along the vertical axis. The float system may further include an associated float control valve disposed in fluid communication with the hydraulic float cylinder and the accumulator. The float control valve is operable to control a fluid pressure of the hydraulic float cylinder and the accumulator. The float control valve is responsive to a float control signal from the support controller to control fluid communication to or from the hydraulic float cylinder and the accumulator to increase or decrease the float pressure of the float system. In one implementation, the float control valve is an on/off hydraulic control valve.

In one implementation of the disclosure, the memory includes a lift calibration algorithm stored thereon. The processor is operable to execute the lift calibration algorithm to determine an ascend delay time and a descend delay time for each of a plurality of different calibration float pressures. The lift calibration algorithm determines vehicle specific calibration data, i.e., the ascend delay time and the descend delay time for each of the plurality of different calibration float pressures, from which the control activation signal may be defined. The processor is operable to execute the lift control algorithm to define the control activation signal for the current float pressure of the float system based on the ascend delay time and the descend delay time determined by the lift calibration algorithm for each of the plurality of different calibration float pressures. By using the calibration data, i.e., the ascend delay time and the descend delay time for each of the plurality of different calibration float pressures, the support controller may more accurately determine the control activation signal so that movement of the header support may be more accurately controlled, such that the head support stops at the commanded support position.

In one aspect of the disclosure, the lift calibration algorithm performs a plurality of iterations, with each respective iteration of the lift calibration algorithm determining the respective ascend delay time and the respective descend delay time for a respective one of the plurality of calibration float pressures of the float system.

In one aspect of the disclosure, for each iteration of the lift calibration algorithm, the support controller may control the float system to exhibit a minimum system pressure. The support controller may then control the hydraulic lift cylinder to move the head support to a full down position. The support controller may then control the float system to exhibit one of the plurality of calibration float pressures, after which the support controller engages the hydraulic lift cylinder to raise the head support from the full down position for a pre-defined calibration ascend time period. The support controller determines an amount of time required for the head support to stop upward movement after cessation of the engagement of the hydraulic lift cylinder for the pre-defined calibration ascend time period. The support controller records this amount of time in the memory as the ascend delay time for that respective one of the plurality of calibration float pressures.

In one aspect of the disclosure, for each iteration of the lift calibration algorithm, after defining the ascend delay time, the support controller may control the hydraulic lift cylinder to move the head support to a full up position. The support controller may then engage the hydraulic lift cylinder to lower the head support from the full up position for a pre-defined calibration descend time period. After which, the support controller determines an amount of time required for the head support to stop downward movement after cessation of the engagement of the hydraulic lift cylinder for the pre-defined calibration descend time period. The support controller records this amount of time in the memory as the descend delay time for that respective one of the plurality of calibration float pressures.

In one aspect of the disclosure, the processor is operable to execute the lift calibration algorithm in response to a user input. In other words, the lift calibration algorithm may be implemented on command and/or as needed, by an operator, such as after changing the work head and/or after servicing the work implement.

In one aspect of the disclosure, the processor may be operable to execute the lift calibration algorithm to determine if at least one pre-calibration condition is satisfied prior to executing the plurality of iterations for each of the plurality of float pressures. For example, the support controller may determine if a safety latch is engaged, if a sensor is operating properly, if the lift cylinder is operating properly, etc. In the event the pre-calibration condition is not satisfied, the support controller may end the lift calibration algorithm and provide a notification to the user of the failed pre-calibration condition.

In one aspect of the disclosure, the processor may be operable to execute the lift control algorithm to receive the commanded support position. The support controller may receive the commanded support position as an operator input provided by an operator of the work machine, or may receive the commanded support position as a command from an automated/autonomous control algorithm associated with the work vehicle.

In one aspect of the disclosure, a work head is attached to and supported by the head support. In one implementation, the work head includes a cutter head operable to cut crop material, and the work machine is configured as a self-propelled windrower.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
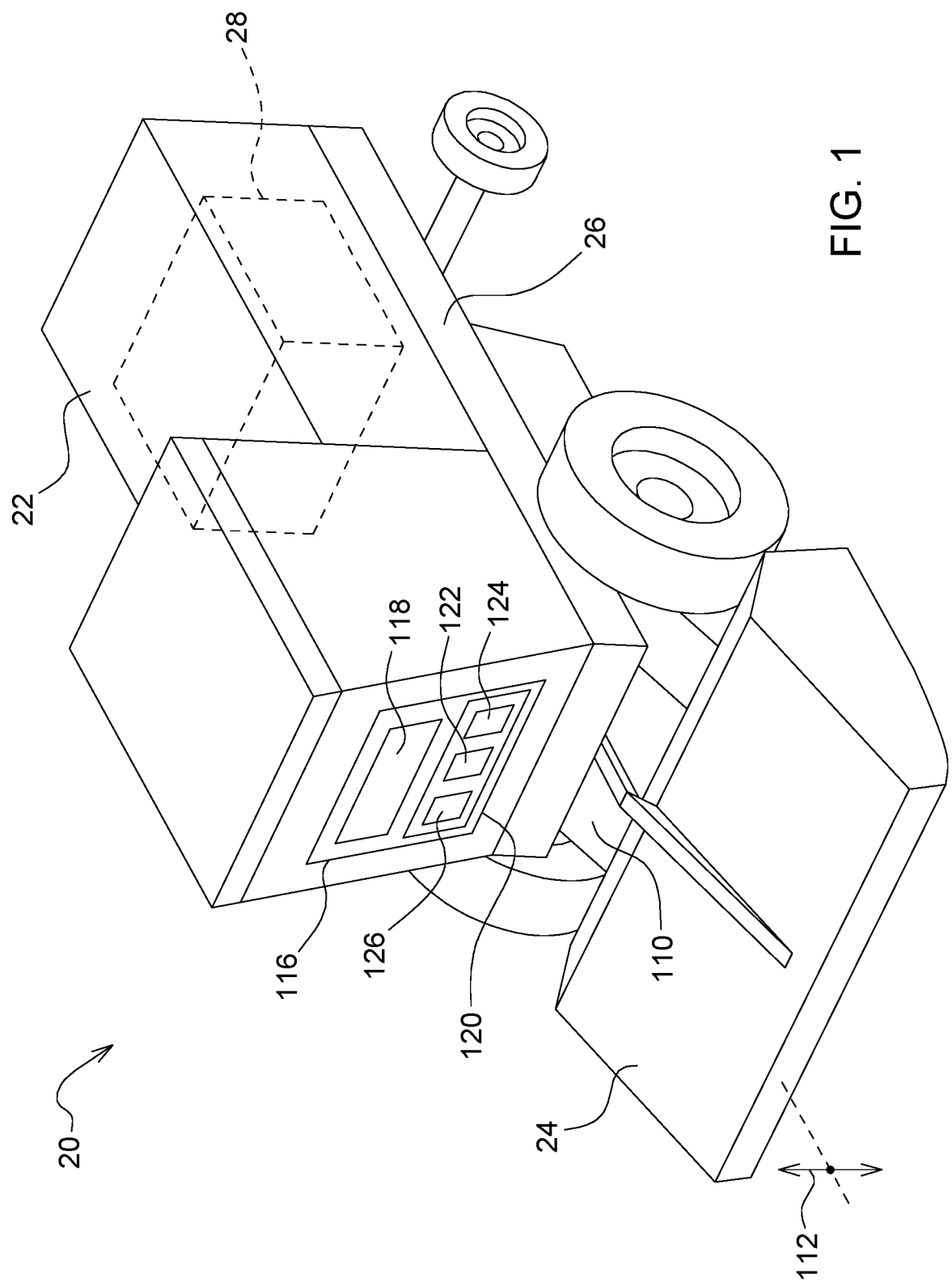
FIG. 1 is a schematic perspective view of an agricultural machine.

Referring to the Figures, wherein like numerals indicate like parts throughout the several views, a work implement is generally shown at 20 in FIG. 1. The example implementation of the work implement 20 shown in FIGS. 1 through 3 includes a self-propelled windrower having a traction unit 22 and an associated a work head 24 attached to and supported by the traction unit 22. However, it should be appreciated that the teachings of this disclosure may be applied to machines other than the example windrower depicted in FIGS. 1 through 3.

Referring to FIG. 1, the traction unit 22 includes a frame 26, which supports a prime mover 28. The prime mover 28 may include, but is not limited to, an internal combustion engine, an electric motor, a combination of both, or some other device capable of generating torque to power the traction unit 22 and systems thereof. A head support 110 interconnects the frame 26 and the work head 24. The head support 110 is moveably attached to the frame 26 for upward and downward movement relative to a ground surface along a substantially vertical axis 112.

Figure 2:
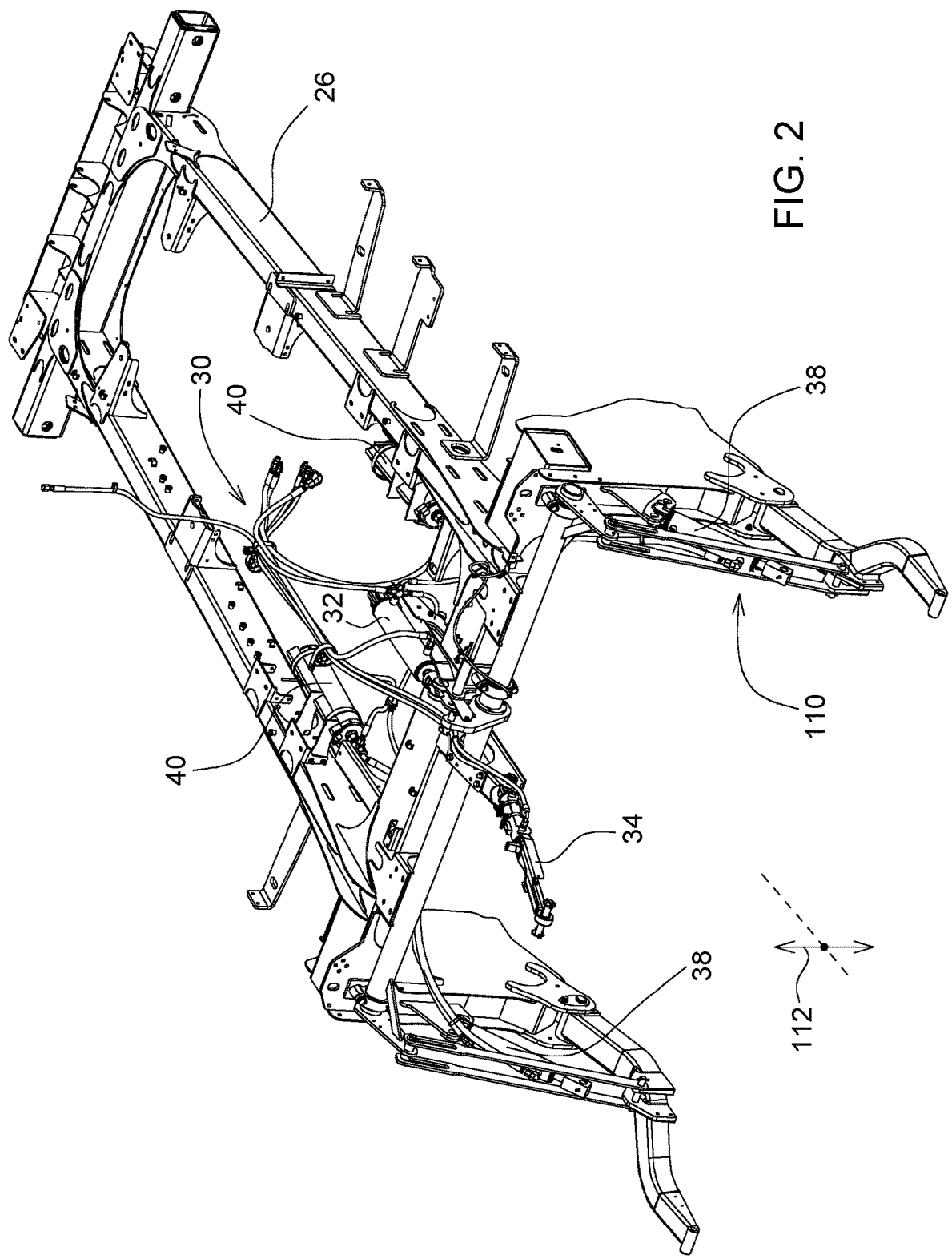
FIG. 2 is a schematic partial perspective view of a frame and a hydraulic system of the agricultural machine.

The work implement 20 includes a hydraulic system 30. Referring to FIG. 2, the example implementation of the hydraulic system 30 includes a hydraulic lift cylinder 32 and a hydraulic tilt cylinder 34. In the example embodiment shown in the Figures and described herein, the lift cylinder 32 interconnects the frame 26 and the head support 110. The lift cylinder 32 is controllable to raise and lower the head support 110 and the work head 24 attached thereto relative to the ground surface. In the implementation shown in the Figures and described herein, the lift cylinder 32 is a single acting hydraulic cylinder, in which fluid pressure may be applied to and/or released from only one side of the lift cylinder 32 to control the movement thereof. As such, fluid pressure may be applied to the lift cylinder 32 to lift the work head 24, and the weight of the work head 24 may be used to lower itself when the fluid pressure is released. However, in other implementations, the lift cylinder 32 may include a double acting hydraulic cylinder as understood by those skilled in the art.

The tilt cylinder 34 is operable to tilt the work head 24 relative to the ground surface, i.e., to change the angular position of the work head 24 relative to the ground surface. In the example embodiment shown in the Figures and described herein, the tilt cylinder 34 interconnects the head support 110 and the work head 24. The tilt cylinder 34 may include a double acting hydraulic cylinder, in which fluid pressure may be applied to and released from both sides of the tilt cylinder 34 to control the movement thereof. As such, fluid pressure may be applied to either side of the tilt cylinder 34 and simultaneously released from the other side of the tilt cylinder 34 to control movement of the tilt cylinder 34. However, in other implementations, the tilt cylinder 34 may include a single acting hydraulic cylinder as understood by those skilled in the art.

The exemplary implementation of the hydraulic system 30 further includes a float system 36. The float system 36 interconnects the frame 26 and the head support 110. The float system 36 includes a pair of hydraulic float cylinders 38. Each of the hydraulic float cylinders 38 include a single acting hydraulic cylinder coupled to respective fluid accumulator 40. Each of the hydraulic float cylinders 38 is attached to the head support 110 and a respective lift arm of the frame 26, thereby interconnecting the frame 26 and the head support 110. Described generally, the float system 36 is controllable to provide a desired float pressure resisting movement of the head support 110 downward along the vertical axis 112. For example, in response to the work head 24 contacting the ground surface or an object that moves the work head and the head support 110 upward along the vertical axis 112, a volume of the accumulator 40 is compressed, which in turn enables the float system 36 to resist downward movement of the work head 24 and the head support 110 along the vertical axis 112, thereby slowing downward travel and allowing the work head 24 to slowly move back into its commanded operating position.

Figure 3:
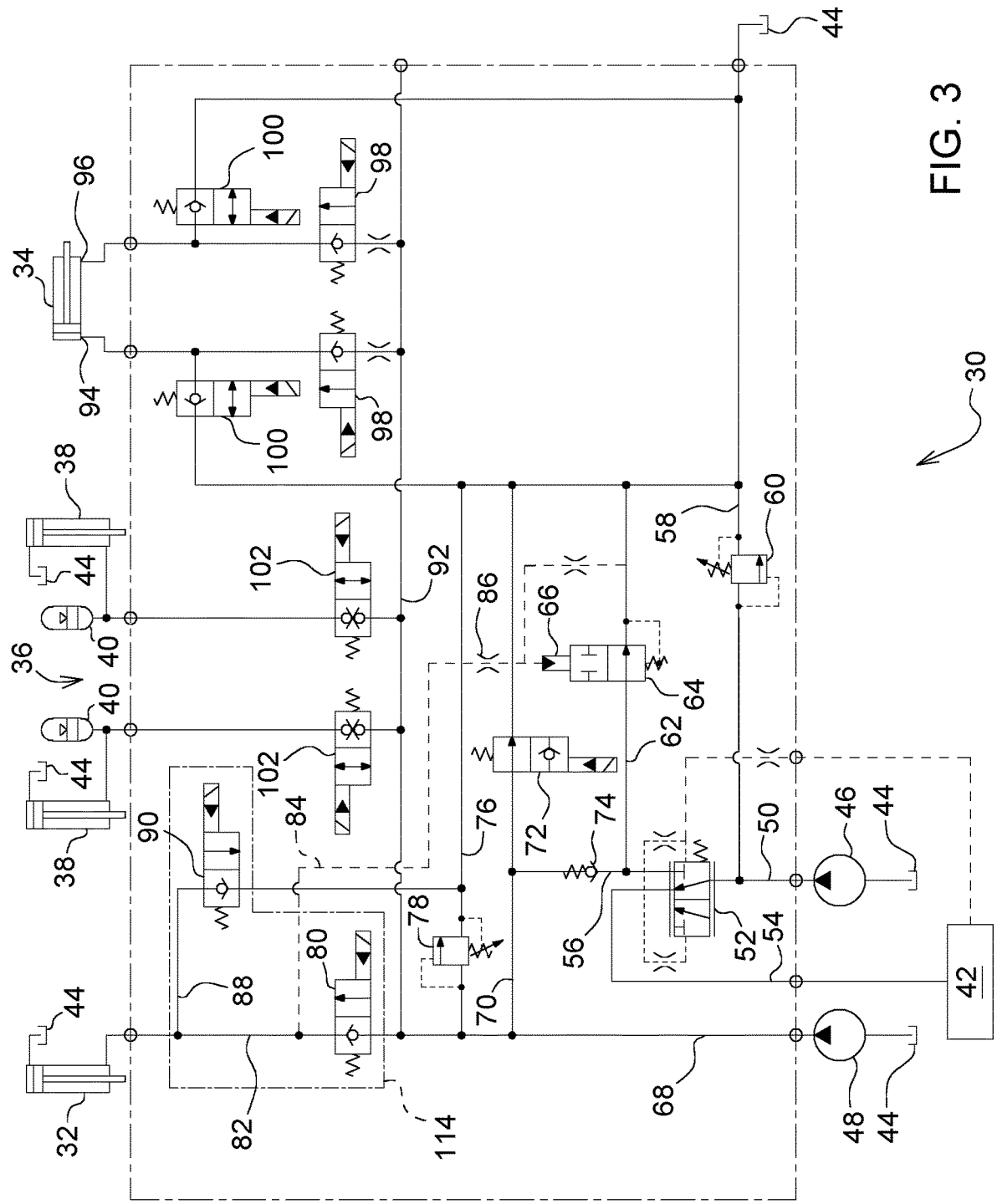
FIG. 3 is a schematic fluid circuit diagram of the hydraulic system.

Referring to FIG. 3, the hydraulic system 30 is shown schematically using standard American National Standards Institute (ANSI) hydraulic symbols to represent the various components of the example hydraulic system 30 therein. The hydraulic system 30 further includes a priority fluid circuit 42. The priority fluid circuit 42 directs pressurized fluid from the hydraulic system 30 to other portions and/or systems of the work implement 20 not described herein.

The hydraulic system 30 further includes a tank 44. For clarity, connections to the tank 44 are shown individually. It should be appreciated that the hydraulic system 30 further includes a plurality of fluid flow pathways, which may include but are not limited to fluid passages, fluid lines, connections, fittings, etc., which connect the various features and/or components of the hydraulic system 30 in fluid communication as represented in FIG. 3. The fluid flow pathways necessary for an understanding of the disclosure are specifically identified by number. However, other fluid flow pathways that are not necessary for an understanding of the disclosure, and which are otherwise understood by those skilled in the art based on the diagram of FIG. 3, are not specifically identified by number.

The hydraulic system 30 includes a first pump 46, and a second pump 48. The first pump 46 and the second pump 48 are powered by torque from the prime mover 28. A first pump outlet fluid passage 50 is connected to and receives fluid flow from the first pump 46. A priority circuit control valve 52 is disposed downstream of the first pump 46, with the first pump outlet fluid passage 50 extending between and connecting the first pump 46 and the priority circuit control valve 52. A priority fluid passage 54 connects the priority circuit control valve 52 and the priority fluid circuit 42. A first pump supply line 56 connects the priority circuit control valve 52 with the other components of the hydraulic system 30.

The priority circuit control valve 52 is a variable position control valve moveable between a first state and a second state. When the priority circuit control valve 52 is disposed in its first state, the priority circuit control valve 52 connects fluid communication between the first pump 46 and the priority fluid passage 54 and disconnects fluid communication between the first pump 46 and the first pump supply line 56. As such, when the priority circuit control valve 52 is disposed in its first state, the first pump output is directed to the priority fluid circuit 42, and is not available to the lift cylinder 32, the tilt cylinder 34, and/or the float system 36. When the priority circuit control valve 52 is disposed in its second state, the priority circuit control valve 52 connects fluid communication between the first pump 46 and the first pump supply line 56 and disconnects fluid communication between the first pump 46 and the priority fluid passage 54. As such, when the priority circuit control valve 52 is disposed in its second state, the first pump output is available to the lift cylinder 32, the tilt cylinder 34, and/or the float system 36.

A first pressure relief line 58 connects the first pump outlet fluid passage 50 and the tank 44 in fluid communication. A first pressure relief valve 60 is disposed in the first pressure relief line 58. The first pressure relief valve 60 is operable to dump fluid from the first pump 46 to the tank 44 when the fluid pressure within the first pressure relief line 58 is greater than a set pressure value.

A first pump exhaust line 62 is connected to and connects the first pump supply line 56 to the tank 44. A combined flow control valve 64 is disposed within the first pump exhaust line 62. The combined flow control valve 64 is controllable between a first state and a second state. In the embodiment shown in FIG. 3 and described herein, the combined flow control valve 64 includes a hydraulic actuated pilot 66 that is operable to move the combined flow control valve 64 between its first state and its second state.

When the combined flow control valve 64 is disposed in its first state, the combined flow control valve 64 is configured to separate the output from the first pump 46 and the output from the second pump 48, such that only the output from the second pump 48 may be directed to the tilt cylinder 34. In the example embodiment shown in the Figures and described herein, when the combined flow control valve 64 is disposed in its first state, the combined flow control valve 64 connects fluid communication between the first pump 46 and the tank 44 so that the output from the first pump 46 is directed to the tank 44, and is not available to operate the lift cylinder 32, the tilt cylinder 34, and/or the float system 36.

When the combined flow control valve 64 is disposed in its second state, the combined flow control valve 64 is configured to combine the output from the first pump 46 and the output from the second pump 48, such that the combined output from the first pump 46 and the output from the second pump 48 may be directed to the lift cylinder 32. In the example embodiment shown in the Figures and described herein, when the combined flow control valve 64 is disposed in its second state the combined flow control valve 64 disconnects or blocks fluid communication between the first pump 46 and the tank 44 so that the output from the first pump 46 is available to operate the lift cylinder 32, the tilt cylinder 34, and/or the float system 36.

A second pump outlet fluid passage 68 is connected to and receives fluid flow from the second pump 48. A second pump exhaust line 70 connects the second pump outlet fluid passage 68 and the tank 44. A second pump exhaust valve 72 is disposed within the second pump exhaust line 70. The second pump exhaust valve 72 is controllable between a first state and a second state. When the second pump exhaust valve 72 is disposed in its first state, the second pump exhaust valve 72 connects fluid communication between the second pump 48 and the tank 44. When the second pump exhaust valve 72 is disposed in its second state, the second pump exhaust valve 72 blocks fluid communication between the second pump 48 and the tank 44 in a direction moving from the second pump 48 toward the tank 44.

The first pump supply line 56 connects the priority circuit control valve 52 and the second pump exhaust line 70. The first pump supply line 56 connects to the second pump exhaust line 70 at a location disposed between the second pump outlet fluid passage 68 and the second pump exhaust valve 72. A flow control valve 74 is disposed in the first pump supply line 56, between the first pump exhaust line 62 and the second pump exhaust line 70. As such, the flow control valve 74 is disposed between the first pump 46 and the lift cylinder 32. The flow control valve 74 is operable to allow fluid flow in a direction moving from the first pump 46 toward the lift cylinder 32, and block fluid flow in a direction moving from the lift cylinder 32 toward the first pump 46. The flow control valve 74 may include, but is not limited to, a check valve, a pilot operated valve, an electrically operated directional control valve, a needle valve, or some other type of device that allows fluid flow in one direction while blocking it in the opposite direction.

A second pressure relief line 76 connects the second pump outlet fluid passage 68 and the tank 44 in fluid communication. A second pressure relief valve 78 is disposed in the second pressure relief line 76. The second pressure relief valve 78 is operable to dump fluid from the second pump 48, and under certain operating conditions the fluid from the combination of the second pump 48 and the first pump 46, to the tank 44 when the fluid pressure within the second pressure relief line 76 is greater than a set pressure value.

The hydraulic lift cylinder includes a lift control valve 114 that is responsive to a control activation signal from a support controller 116 for controlling extension or retraction of the hydraulic lift cylinder. In the example implementation of the hydraulic system 30, the lift control valve 114 is implemented as a lift apply valve 80 and a lift release valve 90, both of which are described in greater detail below. However, it should be appreciated that the lift control valve 114, i.e., the combination of the lift apply valve 80 and the lift release valve 90, may alternatively be implemented as a single valve unit.

The lift apply valve 80 is disposed in communication with the second pump outlet fluid passage 68, between the second pump 48 and the lift cylinder 32. The lift apply valve 80 is controllable between a first state and a second state. When the lift apply valve 80 is disposed in its first state, the lift apply valve 80 blocks fluid communication in a direction moving from the lift cylinder 32 toward the second pump 48. When the lift apply valve 80 is disposed in its second state, the lift apply valve 80 connects or allows fluid communication between the second pump 48 and the lift cylinder 32.

A lift supply fluid passage 82 interconnects the lift apply valve 80 and the lift cylinder 32. A pilot supply line 84 interconnects the lift supply fluid passage 82 and the hydraulic actuated pilot 66 of the combined flow control valve 64. When the lift apply valve 80 is disposed in its second state allowing fluid communication between the second pump 48 and the lift cylinder 32, a portion of the second pump output flows through the pilot supply line 84 to the hydraulic actuated pilot 66 of the combined flow control valve 64 to actuate the combined flow control valve 64 into its second state. When the combined flow control valve 64 is disposed in its second state, the combined flow control valve 64 closes fluid communication to the tank 44, which drives the fluid from the first pump 46 through the flow control valve 74, thereby allowing the output from the first pump 46 to combine with the output from the second pump 48 in order to supply fluid to the lift cylinder 32.

A flow controller 86 may be disposed within one of the pilot supply line 84 or the combined flow control valve 64. The flow controller 86 may include but is not limited to, one of an orifice restriction, a variable flow proportional valve, a needle valve, a relief valve, or some other device capable of restricting fluid flow. The flow controller 86 restricts fluid flow to the hydraulic actuated pilot 66 of the combined flow control valve 64, to slow the rate at which the hydraulic actuated pilot 66 engages or moves the combined flow control valve 64 from its first state to its second state. Slowing the rate at which the combined flow control valve 64 is actuated ramps up the flow rate to the lift cylinder 32 over a defined period of time to limit or reduce a jump, jerk, or surge while operating the lift cylinder 32. For example, in the example embodiment described herein, slowing or controlling the rate at which the combined flow control valve 64 is moved from its first state to its second state limits the potential surge or shock that the work implement 20 may experience when lifting the work head 24.

A lift return line 88 interconnects the lift supply fluid passage 82 and the second pressure relief line 76. The lift return line 88 connects to the lift supply fluid passage 82 at a location between the pilot supply line 84 and the lift cylinder 32. The lift return line 88 connects to the second pressure relief line 76 downstream of the second pressure relief valve 78, between the second pressure relief valve 78 and the tank 44.

The lift release valve 90 is disposed within the lift return line 88. The lift release valve 90 is controllable between a first state and a second state. When the lift release valve 90 is disposed in the first state, the lift release valve 90 blocks fluid flow in a direction moving from the lift cylinder 32 toward the second pressure relief line 76. When the lift release valve 90 is disposed in its second state, the lift release valve 90 connects fluid communication between the lift cylinder 32 and the second pressure relief line 76.

A downstream actuator supply line 92 is connected to the second pump outlet fluid passage 68, between the second pressure relief line 76 and the lift apply valve 80. The downstream actuator supply line 92 supplies fluid flow to the tilt cylinder 34 and the float system 36.

As noted above, the example embodiment described herein and shown in FIG. 3, the tilt cylinder 34 is a double acting hydraulic cylinder, which includes a first port 94 and a second port 96. Each of the first port 94 and the second port 96 include a respective tilt apply valve 98 and a tilt release valve 100 for controlling the position and/or operation of the tilt cylinder 34. Each respect tilt apply valve 98 is disposed in communication with the downstream actuator supply line 92, and is controllable between a first state and a second state. When each respective tilt apply valve 98 is disposed in its first state, the respective tilt apply valve 98 blocks fluid communication in a direction moving from the downstream actuator supply line 92 toward the tilt cylinder 34. When each respective tilt apply valve 98 is disposed in its second state, the respective tilt apply valve 98 connects or allows fluid communication between the downstream actuator supply line 92 and the tilt cylinder 34. Each respect tilt release valve 100 is disposed in communication with the tank 44 and is controllable between a first state and a second state. When each respective tilt release valve 100 is disposed in its first state, the respective tilt release valve 100 blocks fluid communication in a direction moving from the tilt cylinder 34 toward the tank 44. When each respective tilt release valve 100 is disposed in its second state, the respective tilt release valve 100 connects or allows fluid communication between the tilt cylinder 34 and the tank 44.

As described above, the float system 36 includes a pair of hydraulic float cylinders 38, with each respective hydraulic float cylinder 38 connected to a respective fluid accumulator 40. Each respective hydraulic float cylinder 38 is controlled by a respective float control valve 102 that is disposed in fluid communication with the hydraulic float cylinder 38 and the accumulator 40 for controlling a fluid pressure of the hydraulic float cylinder 38 and the accumulator 40. Each respective float control valve 102 is disposed in communication with the downstream actuator supply line 92, and is controllable between a first state and a second state. When each respective float control valve 102 is disposed in its first state, the respective float control valve 102 disconnects or blocks fluid communication between the downstream actuator supply line 92 and their respective hydraulic float cylinder 38. When each respective float control valve 102 is disposed in its second state, the respective float control valve 102 connects or allows fluid communication between the downstream actuator supply line 92 and the hydraulic float cylinder 38. The fluid pressure within the float system 36, and thereby the resistive force generated by the float system 36, may be changed by opening or closing the respective float control valve 102 as is understood by those skilled in the art. The float control valve 102 is responsive to a float control signal from the support controller 116 to control fluid communication to or from the hydraulic float cylinders 38 and the accumulators 40 to increase or decrease the float pressure of the float system 36.

The support controller 116 is disposed in communication with and operable to control the hydraulic lift cylinder 32 and the float system 36. While the support controller 116 is generally described herein as a singular device, it should be appreciated that the support controller 116 may include multiple devices linked together to share and/or communicate information therebetween. Furthermore, it should be appreciated that the support controller 116 may be located on the work implement 20 or located remotely from the work implement 20.

The support controller 116 may alternatively be referred to as a computing device, a computer, a controller, a control unit, a control module, a module, etc. The support controller 116 includes a processor 118, a memory 120, and all software, hardware, algorithms, connections, sensors, etc., necessary to manage and control the operation of the lift cylinder 32 and the float system 36. As such, one or more methods may be embodied as a program or algorithm operable on the support controller 116. It should be appreciated that the support controller 116 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory 120 or received via the communication capabilities) to control or communicate with one or more other components. In certain embodiments, the support controller 116 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The support controller 116 may be in communication with other components on the work implement 20, such as hydraulic components, electrical components, and operator inputs within an operator station of an associated work vehicle. The support controller 116 may be electrically connected to these other components by a wiring harness such that messages, commands, and electrical power may be transmitted between the support controller 116 and the other components. Although the support controller 116 is referenced in the singular, in alternative embodiments the configuration and functionality described herein can be split across multiple devices using techniques known to a person of ordinary skill in the art.

The support controller 116 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 120 may include any non-transitory/tangible medium which participates in providing data or computer-readable instructions. The memory 120 may be non-volatile or volatile. Non-volatile media may include, for example, optical or magnetic disks and other persistent memory. Example volatile media may include dynamic random access memory (DRAM), which may constitute a main memory. Other examples of embodiments for memory 120 include a floppy, flexible disk, or hard disk, magnetic tape or other magnetic medium, a CD-ROM, DVD, and/or any other optical medium, as well as other possible memory devices such as flash memory.

The support controller 116 includes the tangible, non-transitory memory 120 on which are recorded computer-executable instructions, including a lift control algorithm 122 and a lift calibration algorithm 124. The processor 118 of the support controller 116 is configured for executing the lift control algorithm 122 and the lift calibration algorithm 124. The lift control algorithm 122 implements a method of raising or lowering the head support 110 and the associated work head 24 relative to the ground surface, described in detail below.

Figure 4:
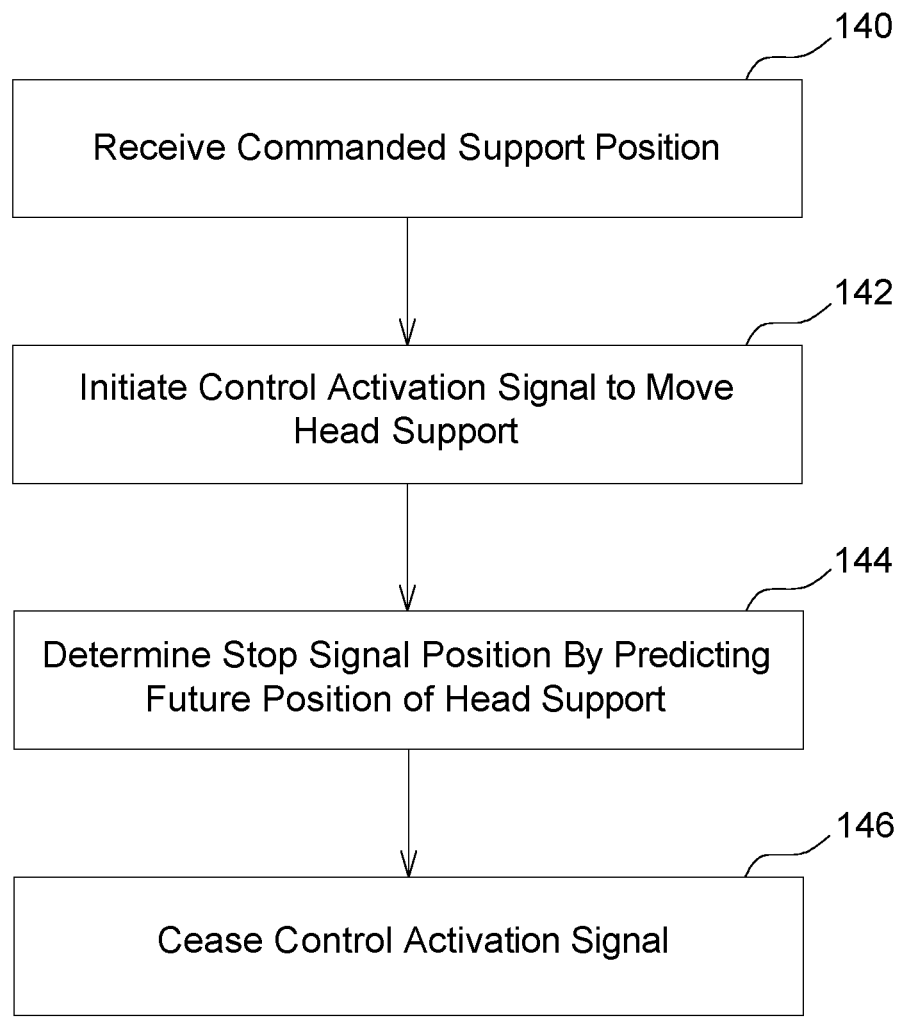
FIG. 4 is a flow chart representing a method of operating the work machine.

Referring to FIG. 4, the processor 118 is operable to execute the lift control algorithm 122 to receive a commanded support position. The step of receiving the commanded support position is generally indicated by box 140 shown in FIG. 4. The commanded support position is a desired position of the head support 110 and the work head 24 relative to the frame and/or the ground surface. The support controller 116 may receive the commanded support position as a user-initiated input via a control device, such as a joystick, touch screen input, keyboard, or other some other input device. Alternatively, the support controller 116 may receive the commanded support position via another computing device and/or algorithm operable on the support controller 116, such as an automated or autonomous operation algorithm that automatically generates and communicates the commanded support position to the support controller 116.

Based on the commanded support position, the support controller 116 may then initiate the control activation signal for commanding movement of the hydraulic lift cylinder 32 to move, i.e., either raise or lower, the head support 110 and the work head 24 from an initial start position to the commanded support position. The step of initiating the control activation signal to move the head support is generally indicated by box 142 shown in FIG. 4. As described above, the control activation signal may include an electronic signal to one or both of the lift apply valve 80 and/or the lift release valve 90 to control movement of the lift cylinder 32.

In order to properly position the head support 110 and the work head 24 at the commanded support position, the support controller 116 must stop or cease the control activation signal at an appropriate location or point of travel. The position at which the control activation signal is stopped may be referred to as the stop signal position. It should be appreciated that the stop signal position is disposed between the initial start position and the commanded support position. As noted above, the latency in actuating the lift apply valve 80 and/or the lift release valve 90, the fluid pressure in the float system 36, the computational time required by the support controller 116, the momentum of the head support 110 and the work head 24, along with other factors, contribute to continued movement of the head support 110 and the work head 24 for a time and distance after the control activation signal is stopped. In other words, after the control activation signal is stopped, it takes a little time for the head support 110 and the work head 24 to stop moving, thereby resulting in some additional movement after stoppage of the control activation signal. This amount of time and the associated extra travel is dependent in part on fluid pressure in the float system 36. The raise or ascend delay time, i.e., the extra time required for movement of the head support 110 and the work head 24 to stop moving after the control activation signal is stopped while raising the head support 110 and the work head 24, increases as the fluid pressure in the float system 36 increases. The fall or descent delay time, i.e., the extra time required for movement of the head support 110 and the work head 24 to stop moving after the control activation signal is stopped while lowering the head support 110 and the work head 24, increases as the fluid pressure in the float system 36 decreases. In order to achieve the commanded support position, the support controller 116 must anticipate or predict the extra movement of the head support 110 and the work head 24 after the control activation signal is stopped, and stop the control activation signal accordingly based on this prediction, i.e., at the stop signal position, such that the head support 110 and the work head 24 stop movement at the commanded support position. The step of determining the stop signal position is generally indicated by box 144 shown in FIG. 4.

In order to predict or anticipate the extra movement of the head support 110 and the work head 24 after stoppage of the control activation signal, and thereby determine the stop signal position, the support controller 116 may sense a position of the head support 110 as the head support 110 moves from the initial start position toward the commanded support position. The support controller 116 may sense the position of the head support 110 over time, from which the support controller 116 may determine a current rate of movement of the head support 110 from the initial start position toward the commanded support position, i.e., a speed of the head support 110. Based on the current rate of movement of the head support 110, i.e., the current speed of the head support 110, the support controller 116 may predict the amount of time it will take for the head support 110 and the work head 24 to stop movement after cessation of the control activation signal, or an extra travel distance that the head support 110 and the work head 24 may move after cessation of the control activation signal, and based on this prediction, determine the stop signal position such that the head support 110 and the work head 24 stop movement at the commanded support position.

As noted above, the fluid pressure in the float system 36 is selectively controllable, and may change the response time of the head support 110 and the work head 24. As such, in order to improve accuracy, the support controller 116 may factor in the current float pressure, i.e., the current fluid pressure of the float system 36, into the prediction of the extra movement of the head support 110 and the work head 24 after stoppage of the control activation signal and the determination of the stop signal position. As such, the support controller 116 may be configured to determine the current float pressure of the float system 36. The support controller 116 may determine the current float pressure of the float system 36 in a suitable manner, such as but not limited to, using an associated fluid pressure sensor in communication the float system 36.

In order to factor in the current float pressure into the determination of the stop signal position, the support controller 116 may reference a look-up table and/or calibration table 126 saved on the memory 120 of the support controller 116. The calibration table 126 may include a respective ascend delay time and a respective descend delay time for each of a plurality of different calibration float pressures. The support controller 116 may the determine, estimate, and/or calculate either the ascend delay time or the descend delay time for the current float pressure from the calibration table 126. The support controller 116 may then use the ascend delay time or the descend delay time for the current float pressure to determine or further define the stop signal location.

Once the support controller 116 has determined the stop signal location, the support controller 116 may cease the control activation signal when the head support 110 reaches the stop signal position. The step of ceasing the control activation signal is generally indicated by box 146 shown in FIG. 4. Once the control activation signal has been stopped, the head support 110 decelerates over a distance such that the head support 110 stops movement at the commanded support position. It should be appreciated that the support controller 116 may define an allowable range surrounding the commanded support position, within which the head support 110 may stop. In other words, the head support 110 may be considered to stop at the commanded support position when the head support 110 stops movement within the allowable range.

Figure 5:
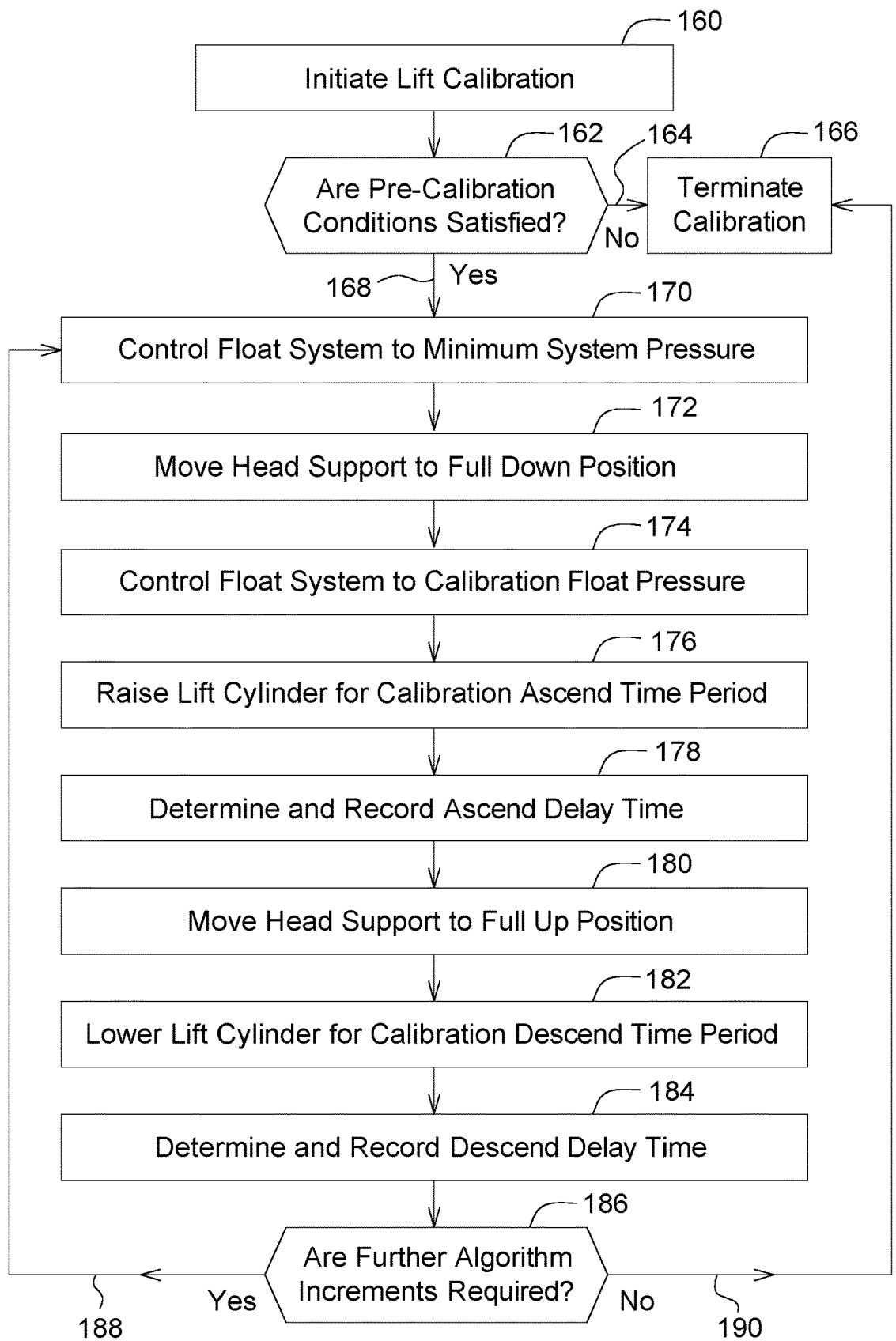
FIG. 5 is a flow chart representing a method of calibrating the work machine.

In one aspect of the disclosure, the memory 120 may include a lift calibration algorithm 124 stored thereon. Referring to FIG. 5, the processor 118 is operable to execute the lift calibration algorithm 124 to determine an ascend delay time and a descend delay time for each of a plurality of different calibration float pressures, which may be used to define the calibration table 126 described above. The processor 118 may execute the lift control algorithm 122 to determine the stop signal position based on the ascend delay time and the descend delay time defined by the calibration table 126, and which are determined by the lift calibration algorithm 124 for each of the plurality of different calibration float pressures.

The support controller 116 may execute the lift calibration algorithm 124 in response to a user input. The step of initiating the lift calibration algorithm is generally indicated by box 160 shown in FIG. 5. An operator may initiate the lift calibration algorithm 124 in response to a change to the work implement 20 or after a period of use. For example, the operator may initiate the lift calibration algorithm 124 after a component of the work implement 20 has been replaced or repaired, when the work head 24 has been replaced, or periodically after use to account for change in performance due to wear. The operator may initiate the lift calibration algorithm 124 by entering a user input, which may include selecting the lift calibration algorithm 124 via an input device. The input device may be integral with the work implement 20, such as but not limited to, control equipment in an associated work cab of the work implement 20. In other implementations, the input device may be a computing/diagnostic device temporarily connected to the support controller 116.

Upon initiation, the lift calibration algorithm 124 may determine if at least one pre-calibration condition is satisfied or is not satisfied prior to executing the plurality of iterations to the ascend delay time and the descend delay time for each of the plurality of different calibration float pressures. The step of determining if any pre-calibration conditions are or are not satisfied is generally indicated by box 162 shown in FIG. 5. The pre-calibration condition may include one or more conditions that must be satisfied before beginning the calibration process. For example, the pre-calibration condition may include, but is not limited to, a determination regarding whether one or more safety locks are or are not engaged, a determination regarding whether the work vehicle is or is not disposed in a drive configuration, a determination whether all required sensors are or are not operating properly, a determination whether all associated fluid control valves of the float system 36 and/or the lift cylinder 32 are or are not operating properly, etc. If one or more of the pre-calibration conditions is determined to fail or not be satisfactory, generally indicated at 164, then the support controller 116 may terminate the lift calibration algorithm 124 and notify the operator of the failed pre-calibration condition. The step of terminating the lift calibration algorithm 124 is generally indicated by box 166 shown in FIG. 5. If all of the pre-calibration conditions are determined to be satisfactory, generally indicated at 168, then the support controller 116 may proceed with the calibration process described below.

The lift calibration algorithm 124 performs a plurality of iterations, with each respective iteration of the lift calibration algorithm 124 determining an ascend delay time and a descend delay time for a respective one of the plurality of calibration float pressures of the float system 36. For each iteration of the calibration process, the support controller 116 performs a plurality of steps. One iteration of the lift calibration algorithm 124 is described in detail below. It should be appreciated that the process described below is repeated for each iteration.

For each iteration of the lift calibration algorithm 124, the support controller 116 controls the float system 36 to exhibit a defined system pressure. The step of controlling the float system 36 to exhibit the defined system pressure is generally indicated by box 170 shown in FIG. 5. In one implementation, the defined system pressure includes a minimum system pressure. Because the fluid pressure of the float system 36 may affect the rate at which the head support 110 descends, setting the float system 36 to a consistent system pressure, e.g., the minimum system pressure, ensures that the calibration process is executed in a manner that provides consistent results.

Once the float system 36 has been configured to exhibit the defined system pressure, e.g., the minimum system pressure, the support controller 116 may then control the hydraulic lift cylinder 32 to move the head support 110 to a full down position. The step of moving the head support 110 to the full down position is generally indicated by box 172 shown in FIG. 5. The support controller 116 may move the head support 110 to the full down position, for example, by opening the lift release valve 90 for a defined period of time. For example, in one implementation, the support controller 116 may open the lift release valve 90 for a period of approximately 5 seconds to enable the head support 110 to move into the full down position.

When the head support 110 is disposed in the full down position, the support controller 116 may then control the float system 36 to exhibit one of the plurality of calibration float pressures. The step of controlling the float system 36 to exhibit the selected calibration float pressure is generally indicated by box 174 shown in FIG. 5. The plurality of calibration float pressures may incrementally increase with each iteration from a minimum pressure to a maximum pressure. For example, in one implementation, the calibration float pressures may range between a minimum pressure of approximately 500 psi, to a maximum pressure of approximately 4000 psi, in increments of approximate 500 psi at each iteration. For example, one iteration of the lift calibration algorithm 124 calculates the ascend delay time and the descend delay time with the calibration float pressure configured to approximately equal 500 psi. In the next iteration, the lift calibration algorithm 124 calculates the ascend delay time and the descend delay time with the calibration float pressure configured to approximately equal 1000 psi.

When the float system 36 is configured to exhibit the calibration float pressure for the current iteration of the lift calibration algorithm 124, the support controller 116 may then engage the hydraulic lift cylinder 32 to raise the head support 110 from the full down position for a pre-defined calibration ascend time period. The step of raising the lift cylinder 32 for the pre-defined calibration ascend time period is generally indicated by box 176 shown in FIG. 5. The pre-defined calibration ascend time period may be set to approximately equal any value less than the time required to move the head support 110 to a full up position. In one implementation, the pre-defined calibration ascend time period may be set to equal approximately 100 ms.

The support controller 116 engages the hydraulic lift cylinder 32 to raise the head support 110 for the pre-defined calibration ascend time period. When the pre-defined calibration ascend time period expires, the support controller 116 disengages the hydraulic lift cylinder 32. The support controller 116 monitors movement of the head support 110 to determine an amount of time required for the head support 110 to stop upward movement after cessation of the engagement of the hydraulic lift cylinder 32 for the pre-defined calibration ascend time period. The support controller 116 records in the memory 120 this amount of time as the ascend delay time for that respective one of the plurality of calibration float pressures. The step of determining and recording the ascend delay time for the respective calibration float pressure is generally indicated by box 178 shown in FIG. 5. In other words, for the calibration float pressure of the current iteration of the lift calibration algorithm 124, the ascend delay time for that calibration float pressure is the amount of time measured between the disengagement of the hydraulic lift cylinder 32 and when upward movement of the head support 110 stops.

Once the ascend delay time for a specific calibration float pressure has been determined and saved in memory 120, the support controller 116 may then control the hydraulic lift cylinder 32 to move the head support 110 to the full up position. The step of moving the head support 110 to the full up position is generally indicated by box 180 shown in FIG. 5. The support controller 116 may move the head support 110 to the full up position, for example, by opening the lift apply valve 80 for a defined period of time. For example, in one implementation, the support controller 116 may open the lift apply valve 80 for a period of approximately 5 seconds to enable the head support 110 to move into the full up position.

With the head support 110 disposed in the full up position, the support controller 116 may then engage the hydraulic lift cylinder 32 to lower the head support 110 from the full up position for a pre-defined calibration descend time period. The step of lowering the head support 110 for the calibration descend time period is generally indicated by box 182 shown in FIG. 5. The pre-defined calibration descend time period may be set to approximately equal any value less than the time required to move the head support 110 to the full down position. In one implementation, the pre-defined calibration descend time period may be set to equal approximately 100 ms.

The support controller 116 engages the hydraulic lift cylinder 32 to lower the head support 110 for the pre-defined calibration descend time period. When the pre-defined calibration descend time period expires, the support controller 116 disengages the hydraulic lift cylinder 32. The support controller 116 monitors movement of the head support 110 to determine an amount of time required for the head support 110 to stop downward movement after cessation of the engagement of the hydraulic lift cylinder 32 for the pre-defined calibration descend time period. The step of determining and recording the descend delay time for the respective calibration float pressure is generally indicated by box 184 shown in FIG. 5. The support controller 116 records in the memory 120 this amount of time as the descend delay time for that respective one of the plurality of calibration float pressures. In other words, for the calibration float pressure of the current iteration of the lift calibration algorithm 124, the descend delay time for that calibration float pressure is the amount of time measured between the disengagement of the hydraulic lift cylinder 32 and downward movement of the head support 110 stops.

With the ascend delay time and the descend delay time for the specific float pressure of the current iteration determined and saved in the memory 120, the support controller 116 may determine if further increments of the process remain. The step of determining if further increments of the iterative process remain is generally indicated by box 186 shown in FIG. 5. If further iterations of the lift calibration algorithm 124 remain, generally indicated at 188 in FIG. 5, then the support controller 116 may repeat the process described above for the next iteration of the lift calibration algorithm 124, in which the float pressure is incremented for the next iteration. The ascend delay time and the descend delay time for each of the plurality of calibration float pressures are saved in memory 120, and may be used by the support controller 116 to define and/or populate the calibration table 126 used in the lift control algorithm 122 described above. If further iterations of the lift calibration algorithm 124 do not remain, generally indicated at 190 in FIG. 5, then the support controller 116 may terminate the lift calibration algorithm 124, generally indicated by box 166 shown in FIG. 5.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A work implement comprising:
a traction unit having a frame;
a head support moveably attached to the frame for upward and downward movement relative to a ground surface along a substantially vertical axis;
a hydraulic lift cylinder interconnecting the frame and the head support, wherein the hydraulic lift cylinder is controllable to raise and lower the head support along the vertical axis;
a support controller disposed in communication with the hydraulic lift cylinder, wherein the support controller includes a processor and a memory having a lift control algorithm stored thereon, wherein the processor is operable to execute the lift control algorithm to:
initiate a control activation signal for commanding movement of the hydraulic lift cylinder to move the head support from an initial start position to a commanded support position;
sense a position of the head support as the head support moves from the initial start position toward the commanded support position;
determine a current rate of movement of the head support from the initial start position toward the commanded support position;
determine a stop signal position of the head support, wherein the stop signal position is determined based on the current rate of movement of the head support toward the commanded support position, and wherein the stop signal position is disposed between the initial start position and the commanded support position; and
cease the control activation signal when the head support reaches the stop signal position, whereby the head support decelerates over a distance after cessation of the control activation signal such that the head support stops movement at the commanded support position.

2. The work implement set forth in claim 1, further comprising a float system interconnecting the frame and the head support, wherein the float system is controllable to provide a desired float pressure resisting movement of the head support along the vertical axis.

3. The work implement set forth in claim 2, wherein the support controller is disposed in communication with the float system, and wherein the processor is operable to execute the lift control algorithm to determine the stop signal position based on a current float pressure of the float system.

4. The work implement set forth in claim 3, wherein the processor is operable to execute the lift control algorithm to determine the current float pressure of the float system.

5. The work implement set forth in claim 3, wherein the memory includes a lift calibration algorithm stored thereon, wherein the processor is operable to execute the lift calibration algorithm to determine an ascend delay time and a descend delay time for each of a plurality of different calibration float pressures, whereby the processor is operable to execute the lift control algorithm to determine the stop signal position based on the ascend delay time and the descend delay time determined by the lift calibration algorithm for each of the plurality of different calibration float pressures.

6. The work implement set forth in claim 3, wherein the memory includes a lift calibration algorithm stored thereon, wherein the processor is operable to execute the lift calibration algorithm to perform a plurality of iterations, with each respective iteration of the lift calibration algorithm determining an ascend delay time and a descend delay time for a respective one of a plurality of calibration float pressures of the float system.

7. The work implement set forth in claim 6, wherein for each iteration of the lift calibration algorithm, the support controller controls the float system to exhibit a minimum system pressure.

8. The work implement set forth in claim 7, wherein for each iteration of the lift calibration algorithm, the support controller controls the hydraulic lift cylinder to move the head support to a full down position.

9. The work implement set forth in claim 8, wherein for each iteration of the lift calibration algorithm, the support controller controls the float system to exhibit one of the plurality of calibration float pressures.

10. The work implement set forth in claim 9, wherein for each iteration of the lift calibration algorithm, the support controller engages the hydraulic lift cylinder to raise the head support from the full down position for a pre-defined calibration ascend time period.

11. The work implement set forth in claim 10, wherein for each iteration of the lift calibration algorithm, the support controller determines an amount of time required for the head support to stop upward movement after cessation of the engagement of the hydraulic lift cylinder for the pre-defined calibration ascend time period, and records in the memory the amount of time as the ascend delay time for that respective one of the plurality of calibration float pressures.

12. The work implement set forth in claim 11, wherein for each iteration of the lift calibration algorithm, the support controller controls the hydraulic lift cylinder to move the head support to a full up position.

13. The work implement set forth in claim 12, wherein for each iteration of the lift calibration algorithm, the support controller engages the hydraulic lift cylinder to lower the head support from the full up position for a pre-defined calibration descend time period.

14. The work implement set forth in claim 13, wherein for each iteration of the lift calibration algorithm, the support controller determines an amount of time required for the head support to stop downward movement after cessation of the engagement of the hydraulic lift cylinder for the pre-defined calibration descend time period, and records in the memory the amount of time as the descend delay time for that respective one of the plurality of calibration float pressures.

15. The work implement set forth in claim 2, wherein the float system includes a hydraulic float cylinder interconnecting the frame and the head support, and an accumulator in fluid communication with the hydraulic float cylinder, wherein upward movement of the head support along the vertical axis compresses a volume of the accumulator for slowing movement of the head support in the downward direction along the vertical axis.

16. The work implement set forth in claim 15, wherein the float system includes a float control valve in fluid communication with the hydraulic float cylinder and the accumulator for controlling a fluid pressure of the hydraulic float cylinder and the accumulator, wherein the float control valve is responsive to a float control signal from the support controller to control fluid communication to or from the hydraulic float cylinder and the accumulator to increase or decrease the float pressure of the float system.

17. The work implement set forth in claim 1, wherein the hydraulic lift cylinder includes a lift control valve in fluid communication with the hydraulic lift cylinder, wherein the lift control valve is responsive to the control activation signal for controlling extension or retraction of the hydraulic lift cylinder.

18. The work implement set forth in claim 1, wherein the processor is operable to execute the lift control algorithm to receive the commanded support position.

19. The work implement set forth in claim 1, wherein the processor is operable to execute the lift calibration algorithm to determine if at least one pre-calibration condition is satisfied prior to executing the plurality of iterations for each of the plurality of float pressures.

20. The work implement set forth in claim 1, wherein the processor is operable to execute the lift calibration algorithm in response to a user input.

\* \* \* \* \*